United States Patent [19]

Clecak et al.

[11] 4,139,276

[45] Feb. 13, 1979

[54] ELECTROCHROMIC DISPLAY DEVICES COMPRISING SUBSTITUTED FLUORENE COMPOUNDS

[75] Inventors: Nicholas J. Clecak, San Jose; Barbara D. Grant, Palo Alto; Annette B. Jaffe; Gary S. Keller, both of San Jose, all of Calif.

[73] Assignee: International Business Machines Corporation, Armonk, N.Y.

[21] Appl. No.: 890,170

[22] Filed: Mar. 27, 1978

[51] Int. Cl.$^2$ ............................. C09K 3/00; G02F 1/17; G02F 1/23
[52] U.S. Cl. ..................................... 350/357; 252/408
[58] Field of Search ............... 350/357; 96/1 E, 90 R; 252/408

[56] References Cited

U.S. PATENT DOCUMENTS

| | | | |
|---|---|---|---|
| 3,317,266 | 5/1967 | Heller et al. | 350/357 |
| 3,451,741 | 6/1969 | Manos | 350/357 |
| 3,652,149 | 3/1972 | Rogers | 252/408 |
| 3,806,229 | 4/1974 | Schoot et al. | 252/408 |
| 3,854,794 | 12/1974 | van Dam et al. | 350/357 |

OTHER PUBLICATIONS

Ronlan, A. et al., J. Am. Chem. Soc., vol. 96, No. 3, pp. 845-849 (1974).
Ronlan, A. et al., J. Am. Chem. Soc., vol. 95, No. 21, pp. 7132-7138 (1973).

*Primary Examiner*—Benjamin R. Padgett
*Assistant Examiner*—T. S. Gron
*Attorney, Agent, or Firm*—Joseph G. Walsh

[57] ABSTRACT

Electrochromic display devices having very desirable stability and reversibility are obtained using as the oxidant certain fluorene compounds substituted with at least two alkoxy groups per molecule. The display device comprises a reactive medium between two electrically conductive electrodes at least one of which is transparent. The reactive medium comprises an anhydrous solvent and an oxidant/reductant pair.

6 Claims, No Drawings

ELECTROCHROMIC DISPLAY DEVICES COMPRISING SUBSTITUTED FLUORENE COMPOUNDS

DESCRIPTION

1. Technical Field

The present invention is concerned with electrochromic display devices. It is an object of the present invention to provide electrochromic display devices having long term stability of both the oxidized and reduced states. It is a further object of the present invention to provide electrochromic display devices having exceptionally high electrochromic reversibility over extended time periods. It is still a further object of the present invention to provide an electrochromic display device exhibiting differential solubilities of the oxidized and reduced states which gives rise to memory capabilities in display applications.

2. Background Art

Electrochromic display devices of several types are well known in the prior art. As far as we are aware, however, the prior art does not teach the use of the compounds disclosed in the present invention for use in electrochromic display.

The use of various chemicals in various types of electrochromic display devices is shown, for example, in U.S. Pat. Nos. 3,451,741; 3,806,229 and 3,854,794. None of these prior art publications in any way refers to the compounds of the present invention.

The fluorene compounds used in the present invention are known in the prior art. They may, for example, be synthesized by the methods disclosed in the Journal of the American Chemical Society, 95, 7132 (1973) and 96, 845, (1974). These references, however, do not teach anything in regard to the use of these materials in electrochromic display devices.

DISCLOSURE OF THE INVENTION

According to the present invention, an electrochromical reaction is used to form a color absorbing species. This color forming process is utilized as a display device by containing the reactive medium between electrically conductive electrodes, at least one of which must be transparent. In such a configuration, information is selectively displayed by segmenting the electrodes into a suitable pattern and applying a potential across the proper electrodes to produce coloration in the desired areas.

In the present invention, the electrochromic coloration reaction takes place due to the oxidation of the substituted fluorene compound at the anode and simultaneous reduction of a suitable redox material at the cathode. The substituted fluorene compound has the formula described below. The useful complementary redox materials are electron acceptors and include such compounds as, for example, phenylhydroquinone, fluorenones, fluorenes, carbazoles which are polynitro substituted, and benzene compounds substituted with electron withdrawing groups. The electron acceptor compound serves as a complementary material in an oxidation/reduction process with the substituted fluorene compound. In that oxidation/reduction reaction, the substituted fluorene compound is oxidized, while the electron acceptor material is reduced, thereby tending to balance the display cell electrochemically. Increased color change may also be obtained due to color produced by the reduced form of the complementary redox material, in addition to the oxidized substituted fluorene compound. Erasure of the image is obtained in a symmetrical cell by short-circuiting the cell or by momentary application of the reverse polarity potential.

As is known to the prior art, the electrochromic reaction is carried out in an anhydrous solvent. Useful solvents include, for example, methyl ethyl ketone, N,N-dimethylformamide, dimethylsulfoxide, N,N-dimethylacetamide, tetrahydrofuran, and acetonitrile.

The substituted fluorene compounds of the present invention have the formula

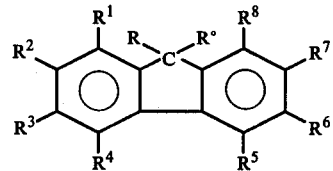

wherein each of R and R° is hydrogen or an alkyl group having up to 20 carbon atoms and each of $R^1$ through $R^8$ is hydrogen or an alkoxy group containing up to 20 carbon atoms, with at least 2 of the groups $R^1$ through $R^8$ being alkoxy groups.

BEST MODE FOR CARRYING OUT THE INVENTION

The stability of the electrochromic materials have been determined by the technique of constant potential reversal coulometry (L. R. Yeh and A. J. Bard, *J. Electroanal. Chem.*, 81, 319 (1977)). In this technique, a solution of the desired material is electrolyzed to give the colored species while monitoring the number of coulombs consumed. The potential is reversed such that the reverse electrochemical reaction occurs and, again, the number of coulombs is measured. If the material is stable and no perturbing reaction occurs, the number of coulombs measured in one direction will equal the number in the reverse direction or the reversibility will be 100%.

$$\text{Reversibility} = \frac{Q \text{ reverse}}{Q \text{ forward}} \times 100$$

The results are discussed below for the compounds of the present invention as compared to a known electrochromic, heptyl viologen.

The electrochromic efficiency for organic compounds is determined by the $\lambda_{max}$ of its absorption and the value of its extinction coefficient. This is typically measured as the optical density per millicoulomb for a unit area.

An example of an electrochromic display device was made up with the following:

0.2M 2,7-dimethoxyfluorene
0.2M phenyl-p-benzoquinone
0.4M tetrabutylammonium tetrafluoroborate in "ultra dry" methylene chloride This solution is placed between two transparent electrodes 5 mils apart and a potential is applied. A color change from colorless to deep blue is observed.

Heptyl viologen, a known electrochromic of the prior art, has a reversibility of about 85% and an efficiency of about 0.17 (OD/mC-cm$^2$). In contrast, 2,7- dimethoxyfluorene has a reversibility of over 99%, and a comparable efficiency.

Similar data were obtained for the following oxidants:

9,9-dimethyl-2,7-dimethoxy fluorene,
2,3,6,7-tetramethoxy fluorene,
2,3,4,5,6,7-hexamethoxy fluorene,
2,3-dimethoxy fluorene,
2,7-dihexyloxy fluorene,
2,7-didecyloxy fluorene.

While we have illustrated and described the preferred embodiments of the invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by Letters Patent is:

1. In a reversible electrochromic display device comprising a reactive medium between two electrically conductive electrodes at least one of which is transparent, said medium comprising an anhydrous solvent and an oxidant/reductant pair in which the reductant is an electron acceptor, the improvement according to which the oxidant is a substituted fluorene compound having the formula

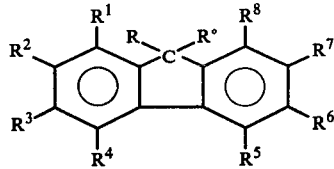

wherein each of R and R° is hydrogen or an alkyl group having up to 20 carbon atoms and each of $R^1$ through $R^8$ is hydrogen or an alkoxy group containing up to 20 carbon atoms, with at least 2 of the groups $R^1$ through $R^8$ being alkoxy groups.

2. A device as claimed in claim 1 wherein the oxidant is 2,7-dimethoxyfluorene.

3. A device as claimed in claim 1 wherein the oxidant is 9,9-dimethyl-2,7-dimethoxyfluorene.

4. A device as claimed in claim 1 wherein the oxidant is 2,3,4,5,6,7-hexamethoxyfluorene.

5. A device as claimed in claim 1 wherein the oxidant is 2,7-dihexyloxyfluorene.

6. A device as claimed in claim 1 wherein the oxidant is 2,7-didecyloxyfluorene.

* * * * *